United States Patent

Pleass

[15] 3,647,537
[45] Mar. 7, 1972

[54] METHOD FOR MAKING ELECTRO-OPTIC DIPOLES

[72] Inventor: Charles M. Pleass, Reiffton, Pa.
[73] Assignee: Bell Telephone Laboratories, Incorporated, Murray Hill, N.J.
[22] Filed: Jan. 21, 1969
[21] Appl. No.: 792,521

[52] U.S. Cl..............................117/227, 117/100, 117/33.3
[51] Int. Cl...........................................................C23c 3/02
[58] Field of Search..................117/201, 227, 100 B, 33.3; 350/150, 160, 267, 155; 353/20

[56] References Cited

UNITED STATES PATENTS

| | | |
|---|---|---|
| 3,257,903 | 6/1966 | Marks....................................350/267 |
| 3,342,587 | 9/1967 | Goodrich et al. ...................117/100 X |
| 3,343,979 | 9/1967 | Hamrin..................................117/100 |
| 3,496,013 | 2/1970 | Baxt et al...............................117/227 |
| 3,511,683 | 5/1970 | Espenscheid et al...............117/100 X |

OTHER PUBLICATIONS

J.O.S. Vol. 55 No. 7 Johnson et al. July 1965

Primary Examiner—William L. Jarvis
Attorney—R. J. Guenther and Edwin B. Cave

[57] ABSTRACT

Electro-optic dipoles are produced by metal coating of presized substrates to the desired resistivity. Substrate materials and processes are described. Coating of substrates is provided with nickel or other metals to finely controlled thicknesses. Uses described include dye pigment and electro-optic shutter.

2 Claims, 2 Drawing Figures

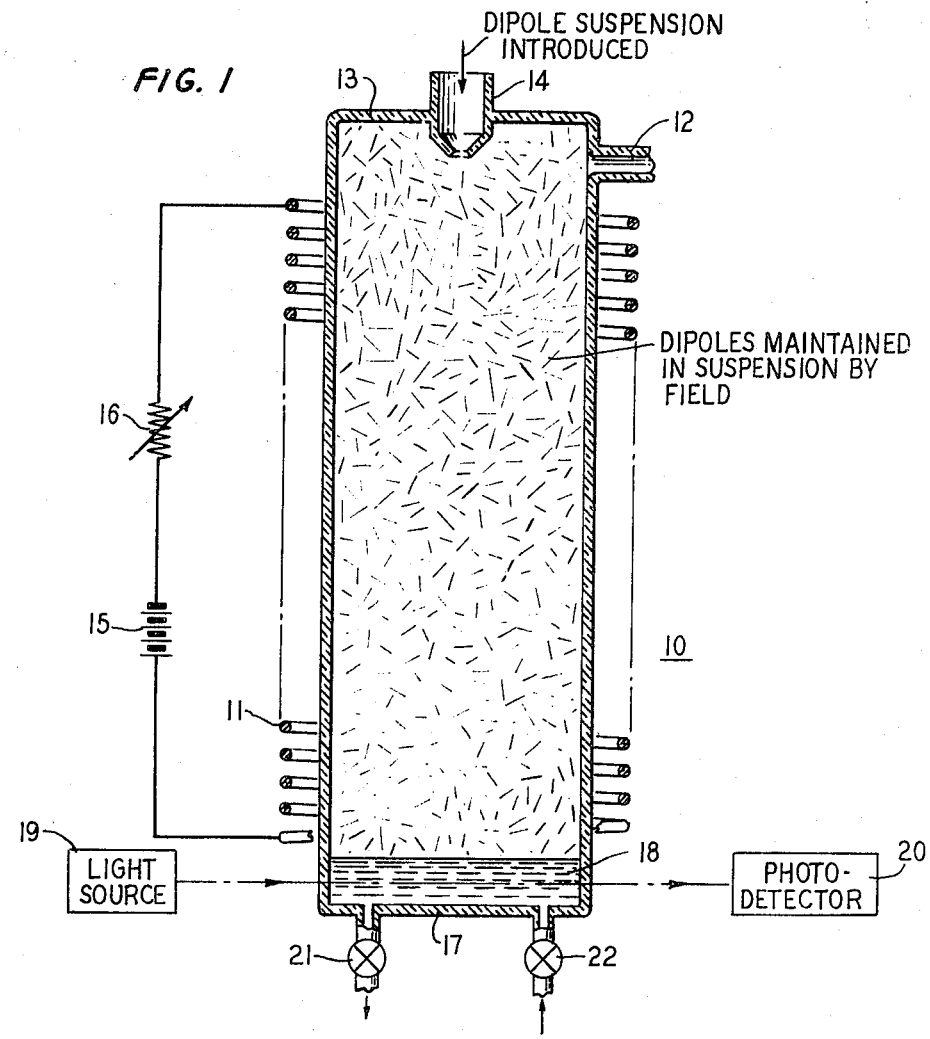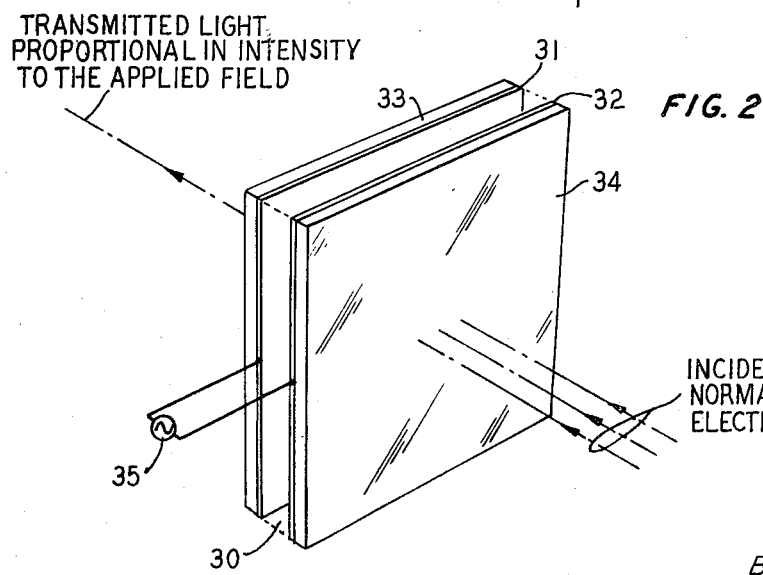
FIG. 1
FIG. 2
INVENTOR
C. M. PLEASS
BY Charles E. Graves
ATTORNEY

METHOD FOR MAKING ELECTRO-OPTIC DIPOLES

This invention relates broadly to controlling the attributes of light, including color, intensity and polarization; and more especially, to electro-optical dipoles used for that purpose.

BACKGROUND OF THE INVENTION

It is known that electrically conducting dipoles of appropriate geometry and orientation can, for example, determine the reflectivity and absorption bands of pigments, and the band pass and polarization characteristics of optical filters. Such dipoles, suitably supported and typically fractions of a micron in length have been proposed for use in dyes, inks, camera shutters, xerographic processes and elsewhere.

The desired control by such dipoles of light amplitude, wavelength and polarization is dependent on the fine control of dipole length, thickness and resistivity. These dipole characteristics are highly specific for a given application. More detailed discussion of the considerations and procedures involved is reported in "Electro-optical Characteristics of Dipole Suspensions" by A. M. Marks, Proceedings of the Second International Liquid Crystal Conference, Aug. 14, 1968.

A principal obstacle to realizing practical applications of such electro-optical dipoles has been the lack of a method for constructing dipoles with the required physical characteristics. One typical method, described in U.S. Pat. No. 3,257,903, involves using crystallites of herapthite (quinine iodosulfate) which crystallizes in microscopic blades whose aspect ratio is approximately correct, and has sufficient electrical conductivity to absorb light. In systems of this type, however, the only controllable parameter is crystallite length, and in consequence the absorptive characteristics are inevitably broadband.

The metal whisker growth techniques heretofore used do not allow concurrent control of the three critical dipole parameters of length, aspect ratio and resistivity. Control of both length and aspect ratio necessarily depends upon the natural process of crystallization which rarely, if ever, in practice accommodates to the desired geometry. Even were it to, the probability of the metal whisker-dipoles having also the desired resistivity is almost nil.

Preparation of metal whisker dipoles which show approximation to the desired behavior is currently carried out by complex techniques such as replication. Small laboratory sample sizes may be obtained in this way, but no preparative technique is known to the art which will allow inexpensive preparation of large quantities of suitable metal dipoles. Thus commercial application in such commodities as architectural glass with automatically controlled light transmission is severely inhibited by the cost and availability of dipole suspensions.

Accordingly, one object of the invention is to construct electrooptic dipoles of highly specific length, aspect ratio and resistivity.

Another object of the invention is to construct dipoles of the described character in large quantities and at low cost.

Another object of the invention is an electro-optic dipole structure that is amenable to substantially any variation as to length, aspect ratio and resistivity.

A general object of the invention is to fully realize through electrooptic dipoles of suitable geometry any desired control of amplitude, polarization and wavelength of light.

SUMMARY OF THE INVENTION

Inert substrates having the desired length and aspect ratio for the given application are prepared and thereafter metal coated to a thickness which precisely determines the electrical resistivity of each dipole.

The freedom to use inert, i.e., electrically insulative, substrates as starting material in preparing electrooptic dipoles allows selection of whatever dipole geometry suits the requirement. For example, one type of substrate material is the numerous needlelike crystals which naturally occur in a wide range of systems.

The dipole size required for modulation of visible light is in a range 1,300–3500 A in length. For this size particle, satisfactory techniques for precision and uniform metal coating of batches were heretofore not available. However, pursuant to one facet of the invention, metal coating of the chosen substrate is achieved advantageously through a process substantially analogous to that described in U.S. Pat. No. 3,404,034 of D. W. Maurer and applicant, which is assigned to applicant's assignee and, to the extent relevant, is also incorporated herein by reference.

The process by which substrates themselves are formed is dependent on the material selected. Fibrous substrates such as glass fiber substrates are formed, for example, by centrifuging out specified lengths of crushed fibers from an aggregate suspended in an inert liquid. Submicron size crystallites of a naturally needlelike shape, such as basic lead acetate or hydrated magnesium silicate exist in the desired geometry; and represent an alternative substrate source. Additionally, linear macromolecules such as, for example, members of the cellulose family can be built to the desired dipole length and aspect ratio, and thereafter metal coated.

A basic feature of the invention is the use of an inert presized substrate as the foundation of an electrooptic dipole whose specific electrical properties are realized by a metal coating process.

The invention, its further objects, features and advantages will be more fully appreciated from a reading of the description to follow of illustrative embodiment thereof.

DESCRIPTION OF THE DRAWING

FIG. 1 is a schematic diagram showing a process for separation of dipole sizes; and FIG. 2 is a schematic diagram showing an electrooptic light modulator.

DETAILED DESCRIPTION OF AN ILLUSTRATIVE EMBODIMENT

The description first deals with illustrative methods for producing dipole substrates; then details methods for metal coating the substrate; next mentions separation of dipoles into size ranges; and finally describes exemplary devices utilizing the resulting dipoles.

Fibers of glass, plastic or any stable organic or inorganic material are suitable to provide the needed inert, stable substrate. Such fibers are long compared to the dipole length sought, and accordingly are crushed and then centrifuged to separate out the desired length. This class of substrate is exemplified by crysotile asbestos, a naturally occuring fiber of magnesium silicate. Commercially available materials suitable as dipole substrates pursuant to the present invention include Avibest "C" made by the FMC Company which is derived from crysotile asbestos; and Baymal, made by Du Pont, which is a needlelike form of aluminum oxide.

Other effective substrates are prepared by fast precipitation of organic or inorganic materials. For example, concentrated solutions of two chemicals which react spontaneously to give the desired substrate material are brought together and the temperature and speed of mixing is adjusted to realize the desired substrate length. This substrate class is exemplified by calcium sulfate crystallites whose preparation is described in the following example.

EXAMPLE 1

Five grams $Ca(OH)_2$ was dissolved in 20 ml. $H_2O$ and 10 ml. $HNO_3$, and heated to approximately 100° C. In a separate vessel, 100 ml. of 3:1 $H_2SO_4:H_2O$ was prepared and brought to a temperature approaching boiling. The $Ca(OH)_2$ solution next was added to the $H_2SO_4$ solution as rapidly as possible, with vigorous stirring. The resulting suspension was diluted with 400 ml. of deionized water and ultrasonically agitated for 5 minutes. The crystallites of calcium sulfate were removed from the aqueous medium by centrifuging, washed with deionized water, centrifuged again, washed with alcohol, and centrifuged yet again. Thereafter the crystallites were dried by evaporation of residual alcohol and then resuspended in the inert medium to be used for metal coating, advantageously amyl acetate as in Example 2 below.

It is in some instances preferred to generate a wide range of dipole substrate sizes prior to metal coating, without attempting to separate a given size fraction. The act of metal coating renders the dipole substrates optically active, and allows the use of precise optical techniques such as the measurement of absorption to be used in monitoring the subsequent separation of a desired size fraction. Other sizing techniques are later described.

EXAMPLE 2

Metal coating of calcium sulfate crystallites, using the suspension prepared in Example 1, proceeds as follows.

A small sample of the suspension was removed for chemical analysis to ascertain the calcium concentration. A drop of the suspension was allowed to dry on a suitable substrate and the average crystallite diameter was obtained by inspection of electron microscope replicas. Using the diameter and the total Ca concentration the effective surface area A of the suspended dipoles was calculated.

Then, a quantity of dicyclopentadienyl nickel was weighed out such that, when dissolved in an amyl acetate suspension and thermally decomposed, the total available nickel will give a coating of the required thickness and resistivity on the calculated area A.

The dicyclopentadienyl nickel was dissolved in the amyl acetate suspension and heated to 130° C. under reflux and a hydrogen gas ambient for 2½ hours; and thereafter cooled to room temperature. The suspension was found to exhibit broadband absorption of visible light and wavelengths adjacent in the electromagnetic spectrum; and respond to applied electric fields by increasing transmission parallel to the field lines, in proportion to the magnitude of the field.

The colloid prepared in this way may be stabilized against coagulation by the addition of 0.28 g. Du Pont 5511 nitrocellulose per 100 ml. of suspension.

It should be noted that the metal used in metal plating of the dipole substrates is not limited. Any metal or metalloid forming chemical compounds which may be decomposed from solution in an inert solvent to produce the metal or metalloid in atomic form may be used. Exemplary alternative compounds are $Mo(CO)_6$ and triisobutyl aluminum.

A substrate material advantageous in the present application is a hydrated magnesium silicate, obtainable by the trade name Avibest-C, and manufactured by the FMC Corporation. This and like commercial products are mixtures of various crystallite lengths. In the case of Avibest-C crystallite diameters ($d$) are of the order of 200 A, and lengths (L) in a mixture average 4,000 A. To obtain crystallites of ideal geometry for absorption in the visible region of the spectrum dimensions covering the range $L=1,300$ A, $d=50$ A, (violet absorption) and $L=2,300$ A, $d=90$ A (red absorption) are required. These numbers imply the use of a suspending liquid of refractive index $n=1.5$, since required dipole length is given by $L=\lambda/(2n$ where $\lambda$ is the wavelength whose specific absorption is required.

EXAMPLE 3

To illustrate the present technique of preparing dipoles from a hydrated magnesium silicate, a starting material is chosen to create a dispersion of dipoles such that all visible wavelengths incident are attenuated equally.

First, hydrated magnesium silicate (Avibest-C) was dispersed in an inert suspending medium, advantageously amyl acetate, using a high-speed rotary blender. Concentration of the silicate in the amyl acetate is not critical. The supernatant liquid containing the required suspended fine particles was refluxed for 3 hours, together with 6 g. of dicyclopentadienyl nickel per gram of suspended solid, covering the reflux with a hydrogen or forming-gas ambient. The particle-containing liquid was then cooled and flushed with nitrogen; and thereafter centrifuged for 1 hour at 10,000 r.p.m. to remove agglomerates and large particles. Next, the concentration of the resulting suspension was adjusted by adding amyl acetate until the light transmission had the required value for the field-free or black condition. The suspension is then ready for use in modulating the amplitude of transmitted light, in a manner to be described.

EXAMPLE 4

The following illustrates one method for separation of dipoles into size ranges corresponding to the absorption of specific colors. The required apparatus is shown in FIG. 1.

An elongated transparent vessel 10 constructed of quartz is surrounded with a helical coil 11 wound to produce a uniform magnetic field within vessel 10. A vacuum of about 1 mm. Hg is applied to vessel 10 by vacuum line 12. A suspension of metal-coated dipoles of varying lengths but uniform diameters in any amyl acetate prepared according to Example 2 is introduced through the top 13 of vessel 10 via atomizer 14. Vessel 10 has a free volume large enough to contain all the amyl acetate as vapor. The dipole suspension is introduced with a minimum of carrier gas.

A voltage source 15 and potentiometer 16 are connected in series relation with coil 11 to control the strength of the magnetic field. As the base 17 of vessel 10 a pool of transparent, low vapor pressure oil 18 is disposed. A wideband light source 19 is directed diameterwise through the oil 18 upon a photodetector 20.

Voltage is adjusted so that the magnetic field acts to draw the metal-coated dipoles upward against gravitational settling. The field then is slowly decreased. The heaviest dipoles are the first to be released from the suspension in which the field holds the dipoles.

The onset of dipole settling will be evidenced by a change in absorption of the oil 18. The component of the incident light from source 19 corresponding to the length of the initial settling (heaviest) dipoles will be absorbed. In this manner, the absorption of the suspension forming at the base 17 is monitored; and the oil containing the desired dipole material removed as through outlet valve 21 while fresh oil from inlet valve 22 replaces the old. The desired material thus is removed by liquid exchange at constant field. Continuous or semicontinuous changing of the oil 18 is required for the case where the desired dipoles are not the longest in the batch. The band pass of the suspension removed—and hence its color—will depend on the magnitude of the decrease in magnetic field between liquid exchanges.

This process is essentially a fractionation using the opposing forces of gravity and a variable, homogeneous magnetic field. It is applicable to dipoles prepared by coating with ferromagnetic metals such as iron or nickel. As with any other fractionation, it may be repeated as many times as desired to give a product of the desired bandwidth. Color purity will be proportional to the extent of fractionation.

Alternative routes to fractionation such as high-speed centrifuging may be used, which are not restricted in their application to dipoles prepared from ferromagnetic metal coatings. Optical monitoring of the suspension again is used to establish the fraction corresponding to a desired band pass.

An important application if dipoles constructed pursuant to the present teachings is as the color agent in dyes, inks and the like. Present agents suffer from varying degrees of instability due to chemical changes induced by heat, light, moisture or the passage of time. Furthermore, certain colors, such as pure magenta, for example, cannot be realized in a practical pigmentation, due to the lack of chemical compounds which will absorb only in the specific spectral region which determines the color. Absorption and reflection spectra of chemical dyestuffs are never sharply defined, and in general contain several peaks resulting from interaction of light with various electronic states existent in the complex dye molecules. Thus the magenta dye commonly used in color printing shows strong reflection from 600–700 m$\mu$ and a secondary peak of 440 m$\mu$ with intensities in the approximate ratio of 9:2. The ideal pigment would cover only the wavelength range 600–700 m$\mu$. Other peaks such as that found at 440 m$\mu$ in present dye detract from the purity of the color. In this example the sensitivity of the human eye is such that the smaller extraneous peak at 440 m$\mu$ is weighted far more heavily by the eye than the instrumental ratio of 9:2 would indicate, and the observed color is correspondingly distorted. In preparing color reproductions using the triad cyan, yellow and magenta, veracity and brilliance are lost as a result of extraneous reflections such as that described.

It has been suggested elsewhere that extremely sharp and permanent coloration are achievable with dipoles. Until the present invention, however, such dipoles have not been realized in large quantities with the desired geometries and at low cost. The example to follow demonstrates how, through use of the inventive dipoles, permanent pigment of a highly specific color response is achieved and inserted into fabric fibers.

EXAMPLE 5

Dipoles of a geometry and resistivity such as to give a magenta reflection, free of extraneous color, are prepared using the art embodied in Examples 3 and 4. Absorption of all incident light in the range 400–600 m$\mu$ is desired, and this function is fulfilled by dipoles in the length range 133–200 m$\mu$ suspended in a medium of refractive index 1.5, with distributed resistances of substantially 80$\Omega$ and aspect ratios of about 25:1.

Only one class of dipole substrate is used, thus fixing the substrate diameter. In the present example, the dipole substrate diameter is chosen to be 6 m$\mu$, giving a 25:1 aspect ratio in the center of the desired absorption band (500 m$\mu$) after metal coating and separation in accord with Examples 3 and 4.

Next, the dipoles are dispersed in a suitable artificial fiber precursor, for example, nylon. The nylon is spun to give fiber suitable for weaving into cloth. Incorporation into nylon (refractive index 1.53) provides the desired magenta color. Since the dipoles are of a size which prohibits their diffusion through the nylon, and are not susceptible to attack by oxygen, moisture or other chemical reagents commonly used in the washing or cleaning of fabrics which may diffuse inward, the color of material woven from such fibers will remain fixed.

EXAMPLE 6

Described below and pictured in FIG. 2 is a broadband electro-optic shutter using the dipoles of the present invention, suitable for use in automatic control of light intensity in such devices as cameras and architectural glass.

The preparation of suitable dipole suspensions has been described in Examples 2 and 3. Use of such suspensions to gain amplitude control of white light relies on the orienting effect of an electric field, applied parallel to the direction of propagation of the light. The suspension designated 30 was therefore replaced between transparent conducting electrodes 31, 32. Electrodes 31, 32 were prepared by coating glass plates 33, 34 with a thin transparent conduction layer of $SnO_2$. Spacing of 0.1 cm. between electrodes 31, 32 was provided by insulating spacers, not shown. Dipole concentration was adjusted by addition or evaporation of suspending liquid to a value corresponding to the required minimum transmission in the absence of field. Voltage was applied which oriented the dipoles against the randomizing influence of Brownian motion, with maximum transmission attained when all dipoles have their major axes oriented at right angles to the planes of their electrodes. Absorption in this condition was proportional to the sum of the dipole cross-sectional areas, and did not differ appreciably from the absorption of the inert suspending medium. Alternating polarity of the electrodes at relative high frequencies up to 30 kHz. is advantageous when mobile charges such as ions are present within the dipole suspension, since the latter migrate rapidly to the electrode of opposite polarity and partially counteract the applied field. However, 60 cycle AC is adequate if careful attention is given to the chemical purity of the components of the suspension. Alignment time of suspension of the present dipoles contained in FIG. 2, under a 20 kv./cm. field is in the 1–2 millisecond range, and relaxation time 50–100 milliseconds.

The spirit of the invention is embraced in the scope of the claims to follow.

What is claimed is:

1. A multiplicity of elongated, needlelike dipoles dispersed in a medium, said dipoles comprising electrically inert substrates having a selected uniform length within a range of from 1,300 to 3,500 angstrom units, and a selected aspect ratio, each said substrate having a metallic coating of a uniform thickness selected to establish a desired electrical resistivity, the selection of said length, aspect ratio and resistivity being determinative of a desired optical effect to be achieved by said dipoles in said medium.

2. A method for making electrooptic dipoles, comprising the steps of:
producing a multitude of elongated substrates from an electrically insulative material, each substrate having a selected length in the range of from 1,300 to 3,500 angstrom units and a selected aspect ratio; and
metal coating all said substrates to a thickness that achieves for each a uniform desired electrical resistivity;
the selection of said length, aspect ratio and metal coating thickness being determinative of a desired optical effect to be achieved by said dipoles.

* * * * *